United States Patent
Yi

(10) Patent No.: US 10,122,512 B2
(45) Date of Patent: Nov. 6, 2018

(54) METHOD AND APPARATUS FOR SUPPORTING NETWORK LISTENING IN WIRELESS COMMUNICATION SYSTEM

(71) Applicant: LG ELECTRONICS INC., Seoul (KR)

(72) Inventor: Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 15/102,829

(22) PCT Filed: Jan. 9, 2015

(86) PCT No.: PCT/KR2015/000214
§ 371 (c)(1),
(2) Date: Jun. 8, 2016

(87) PCT Pub. No.: WO2015/105363
PCT Pub. Date: Jul. 16, 2015

(65) Prior Publication Data
US 2016/0315740 A1    Oct. 27, 2016

Related U.S. Application Data

(60) Provisional application No. 61/925,638, filed on Jan. 9, 2014.

(51) Int. Cl.
*H04L 5/00* (2006.01)
*H04B 7/26* (2006.01)
(Continued)

(52) U.S. Cl.
CPC ........... *H04L 5/005* (2013.01); *H04B 7/2656* (2013.01); *H04L 5/001* (2013.01); *H04L 5/0073* (2013.01);
(Continued)

(58) Field of Classification Search
CPC ..... H04L 5/005; H04L 5/0073; H04L 5/1469; H04L 5/001; H04W 72/005; H04W 56/001; H04W 56/0015; H04B 7/2656
See application file for complete search history.

(56) References Cited

U.S. PATENT DOCUMENTS

| | | | |
|---|---|---|---|
| 2011/0128903 A1* | 6/2011 | Futaki | H04W 72/005 370/312 |
| 2012/0224533 A1 | 9/2012 | Lin et al. | |
| 2014/0126496 A1* | 5/2014 | Sayana | H04B 7/024 370/329 |

(Continued)

FOREIGN PATENT DOCUMENTS

| | | | | |
|---|---|---|---|---|
| JP | 2013-153660 | * | 7/2013 | ............ H04W 72/04 |
| JP | 2013-162217 | * | 8/2013 | ............... H04B 7/00 |
| JP | 2013-164684 | * | 8/2013 | ............... H04B 7/00 |

OTHER PUBLICATIONS

"Enhanced mechanisms for network listening", 3GPP TSG RAN WG1 Meeting #75, R1-135038, San Francisco, USA, Nov. 11-15, 2013, Huawei, HiSilicon, 6.2.6.3, Discussion/Decision.
(Continued)

*Primary Examiner* — Ian N Moore
*Assistant Examiner* — Justin T Van Roie
(74) *Attorney, Agent, or Firm* — Birch, Stewart, Kolasch & Birch, LLP

(57) ABSTRACT

A method and apparatus for supporting a network listening in a wireless communication system is provided. A user equipment (UE) receives a subframe configuration used for the network listening, and monitors subframes indicated as subframes used for radio interface based synchronization (RIBS) by the received subframe configuration.

11 Claims, 16 Drawing Sheets

Deployment Scenario of Small cell with/without Macro Coverage

KEY:
: macro cell F1
: small Cell F2
: indoor

(51) Int. Cl.
*H04W 56/00* (2009.01)
*H04L 5/14* (2006.01)
*H04W 72/00* (2009.01)

(52) U.S. Cl.
CPC ......... *H04L 5/1469* (2013.01); *H04W 56/001* (2013.01); *H04W 56/0015* (2013.01); *H04W 72/005* (2013.01)

(56) References Cited

U.S. PATENT DOCUMENTS

2016/0149672 A1* 5/2016 Shimezawa ........... H04L 1/1812
370/329
2016/0165560 A1* 6/2016 Takeda .................. H04W 16/32
370/350

OTHER PUBLICATIONS

"Further evaluations on radio-interface based small cell synchronization", 3GPP TSG RAN WG1 Meeting #75, R1-135633, San Francisco, USA, Nov. 11-15, 2013, CMCC, 6.2.6.3, Discussion and Decision, pp. 1-11.

"Impact of small cell on-off switching on radio interface-based network synchronization", 3GPP TSG RAN WG1 Meeting #75, R1-135406, San Francisco, USA, Nov. 11-15, 2013, Hitachi Ltd., 6.2.6.3, Discussion and Decision.

"On solutions for radio-based synchronization", 3GPP TSG RAN WG1 Meeting #75, R1-135551, San Francisco, USA, Nov. 11-15, 2013, BlackBerry UK Limited, 6.2.6.3, Discussion, pp. 1-5.

* cited by examiner

[Fig. 1]
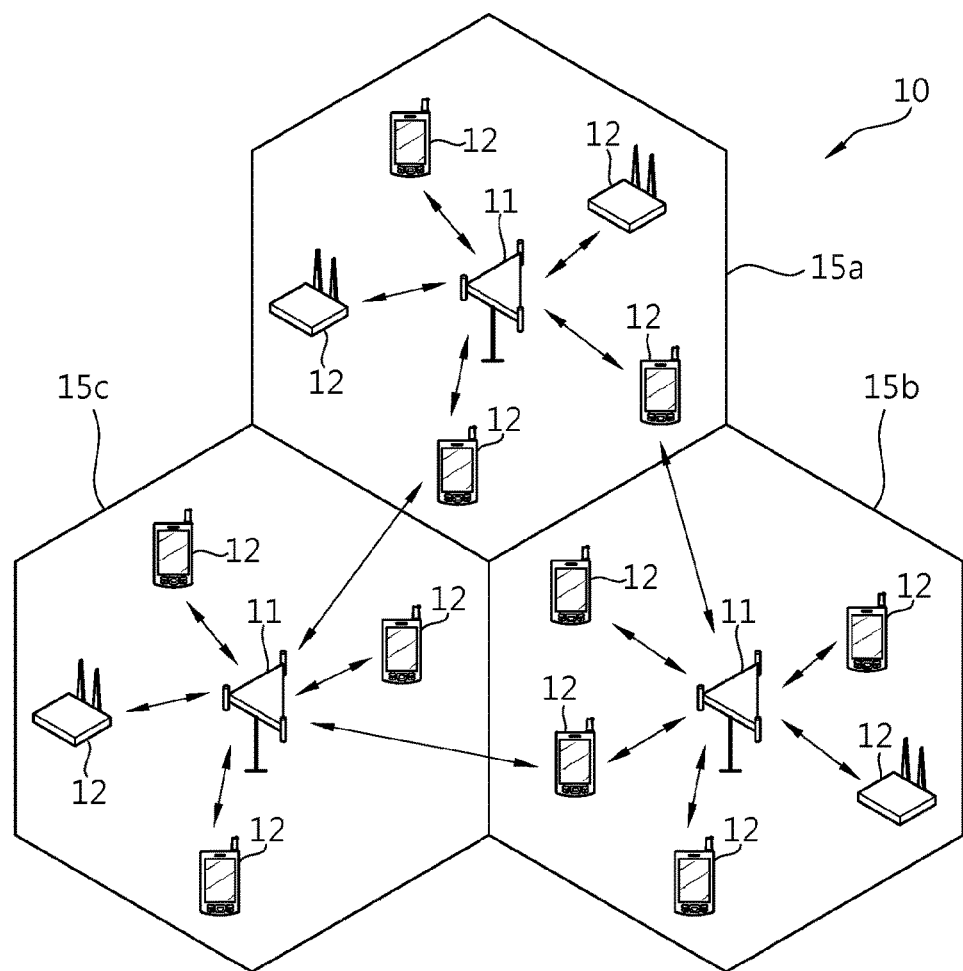
[Fig. 2]
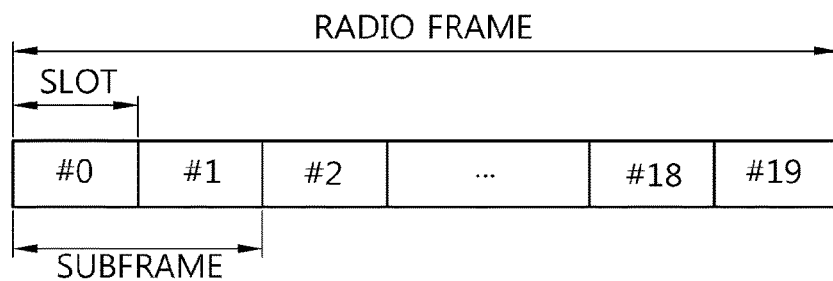

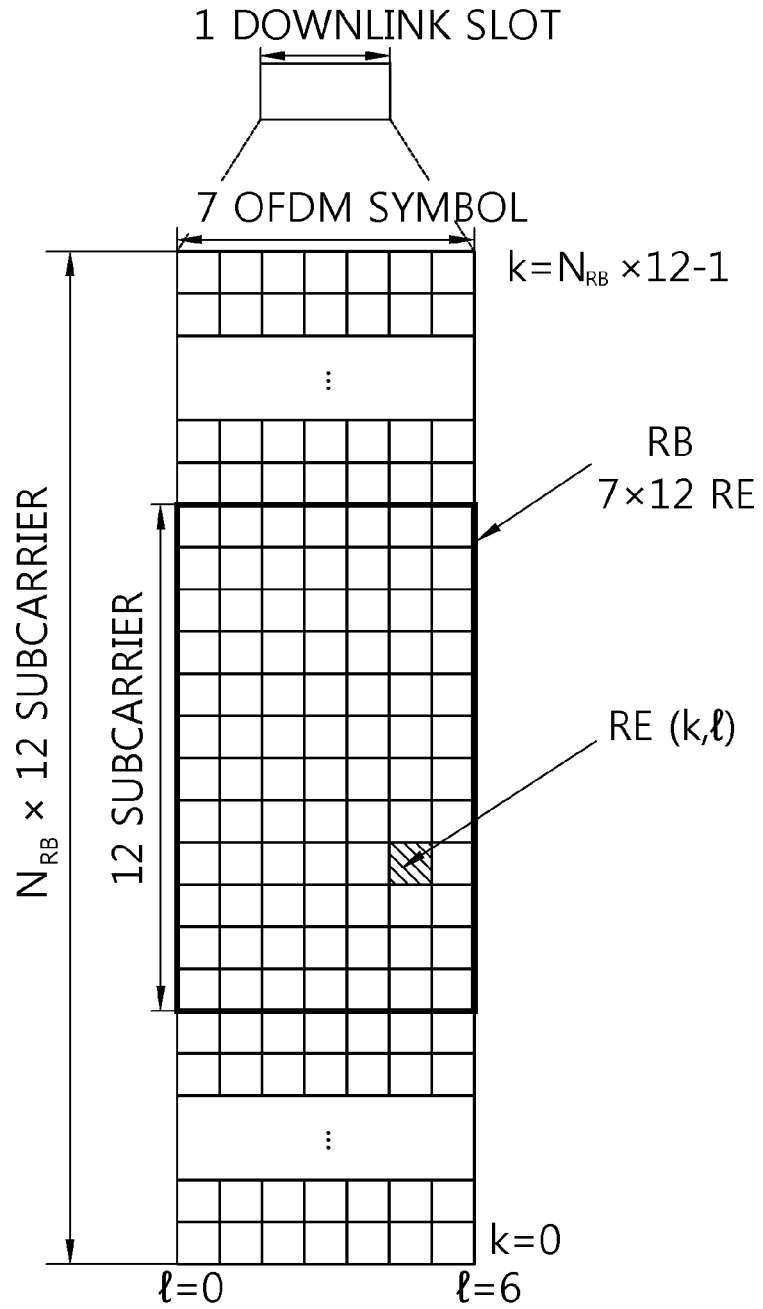
[Fig. 3]

[Fig. 4]
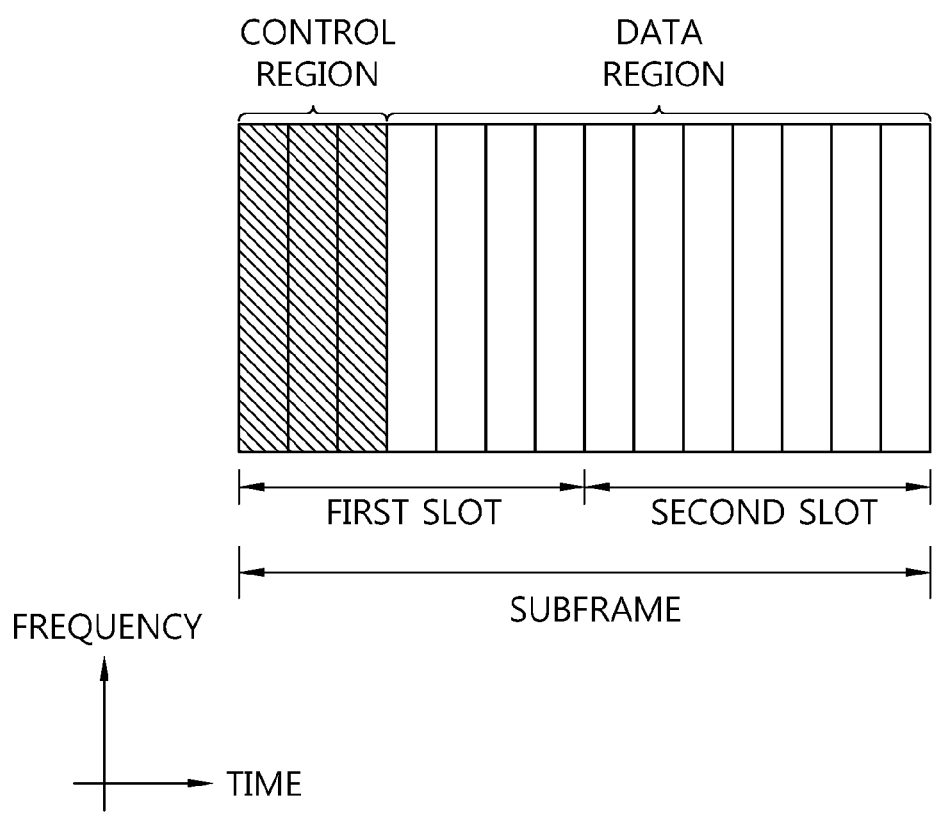

[Fig. 5]
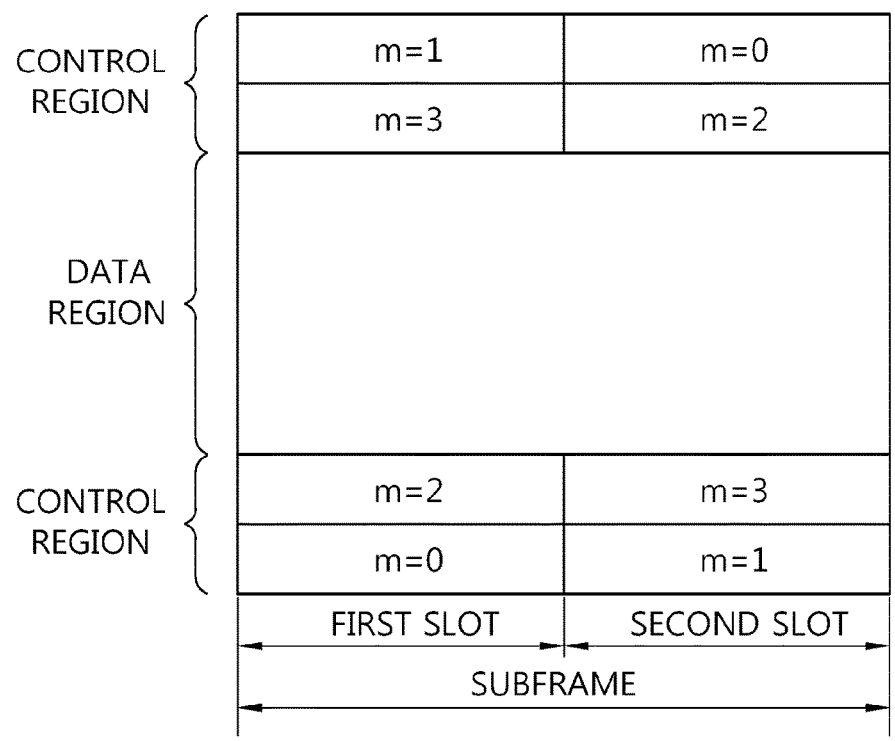

[Fig. 12]
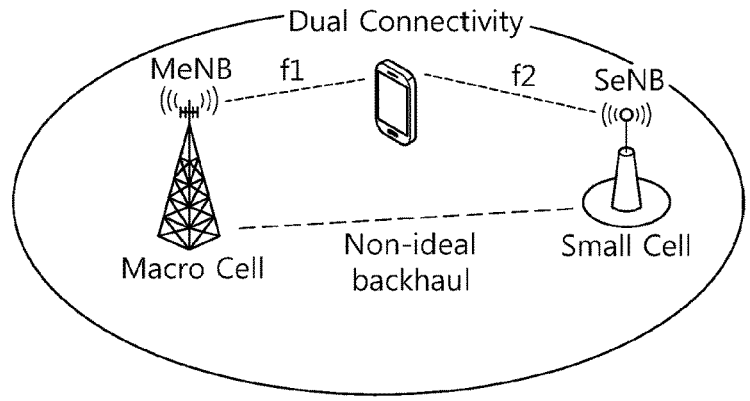
[Fig. 13]
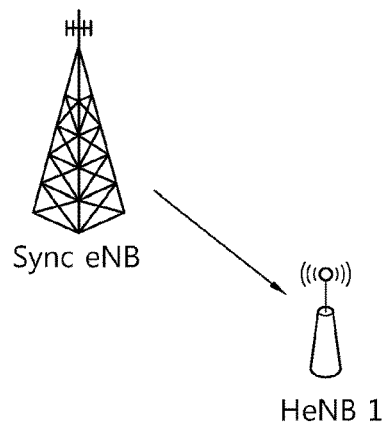
[Fig. 14]
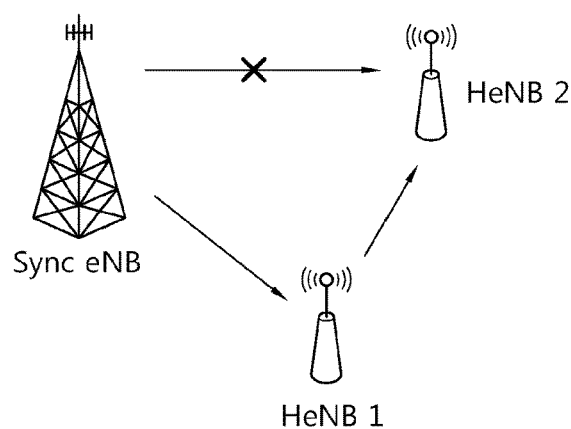

[Fig. 15]
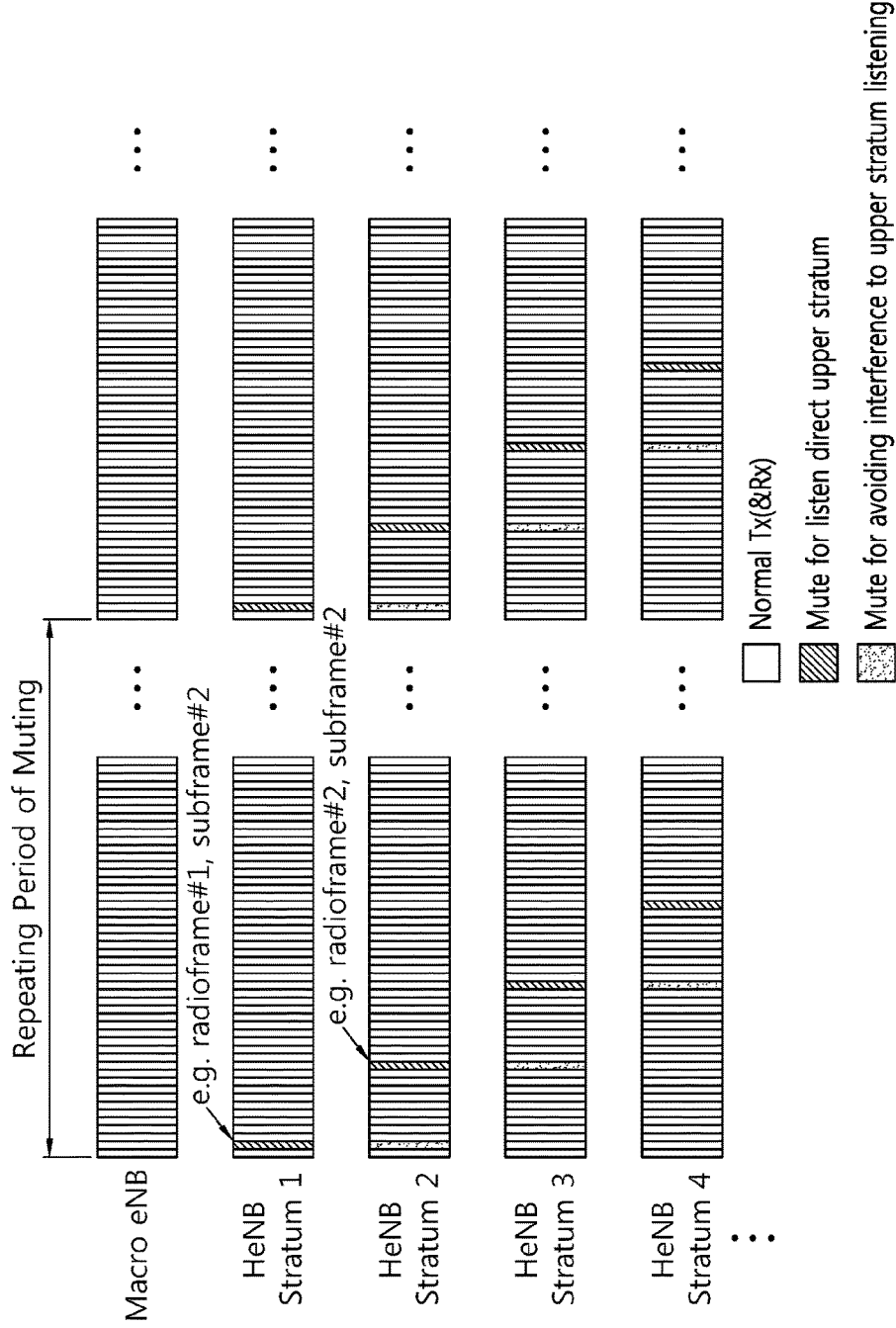

[Fig. 16]
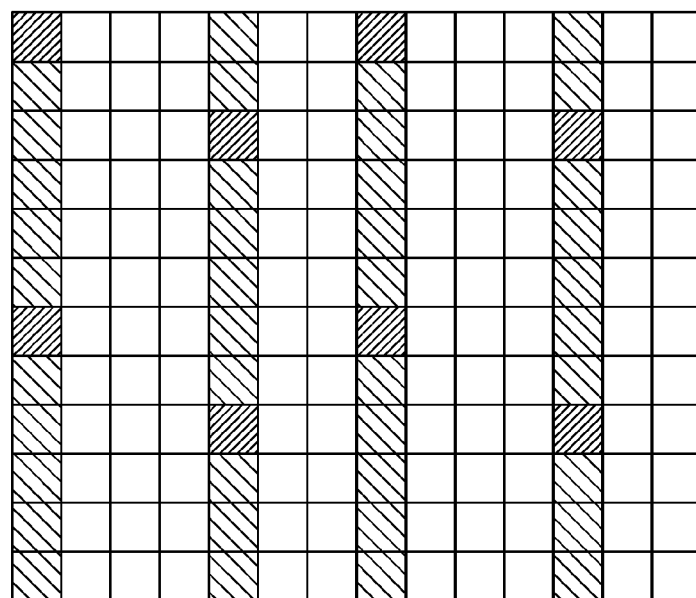

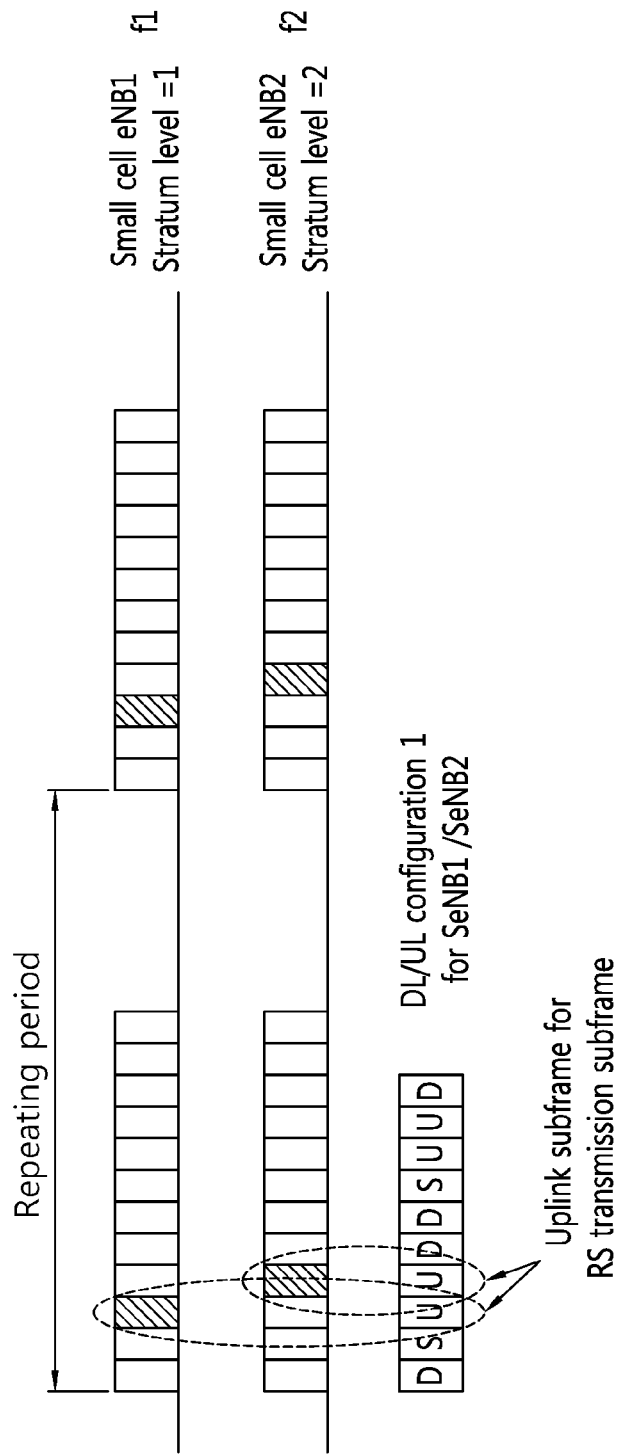
[Fig. 17]

[Fig. 18]
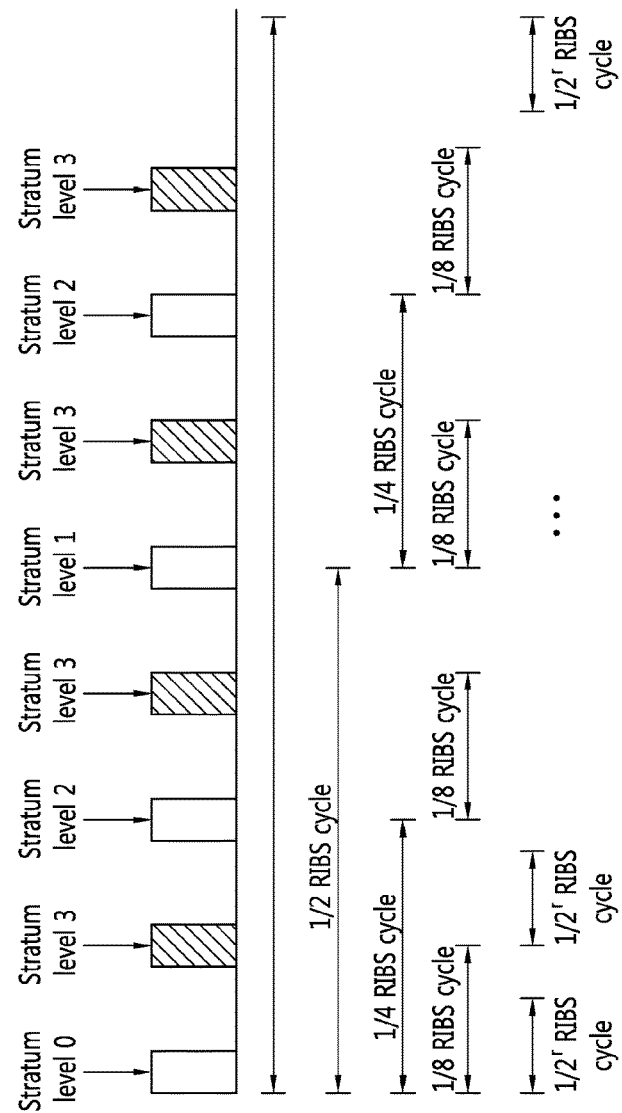
[Fig. 19]
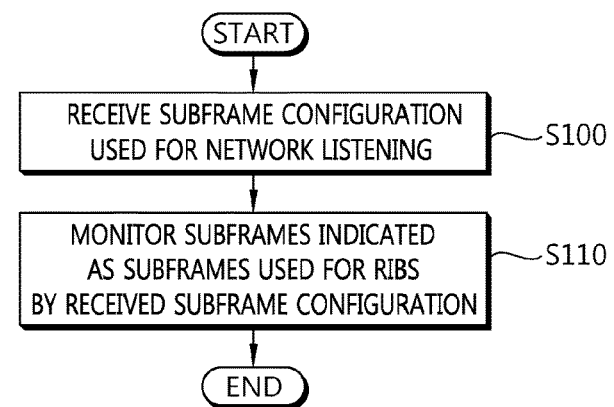

[Fig. 20]
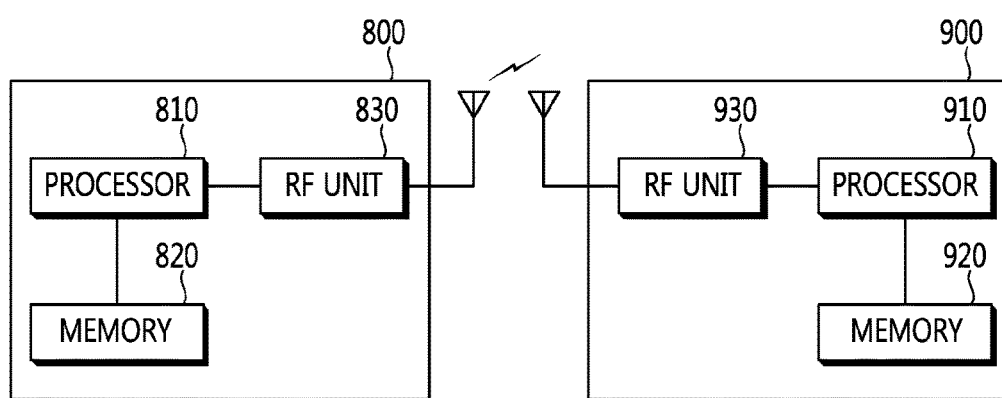

METHOD AND APPARATUS FOR SUPPORTING NETWORK LISTENING IN WIRELESS COMMUNICATION SYSTEM

CROSS REFERENCE TO RELATED APPLICATIONS

This application is the National Phase of PCT/KR2015/000214 filed on Jan. 9, 2015, which claims priority under 35 U.S.C. 119(e) to U.S. Provisional Application Ser.No. 61/925,638filed on Jan. 9, 2014, all of which are hereby expressly incorporated by reference into the present application.

TECHNICAL FIELD

The present invention relates to wireless communications, and more particularly, to a method and apparatus for supporting a network listening in a wireless communication system.

BACKGROUND ART

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. In CA, two or more component carriers (CCs) are aggregated in order to support wider transmission bandwidths up to 100 MHz. A user equipment (UE) may simultaneously receive or transmit on one or multiple CCs depending on its capabilities. A Rel-10 UE with reception and/or transmission capabilities for CA can simultaneously receive and/or transmit on multiple CCs corresponding to multiple serving cells. A Rel-8/9 UE can receive on a single CC and transmit on a single CC corresponding to one serving cell only.

In 3GPP LTE Rel-12, a new study on small cell enhancement has started, where dual connectivity is supported. Dual connectivity is an operation where a given UE consumes radio resources provided by at least two different network points (master eNB (MeNB) and secondary eNB (SeNB)) connected with non-ideal backhaul while in RRC_CONNECTED. Furthermore, each eNB involved in dual connectivity for a UE may assume different roles. Those roles do not necessarily depend on the eNB's power class and can vary among UEs.

The synchronization requirement for a home eNB (HeNB) is defined as the difference in radio frame start timing, measured at the transmit antenna connectors, between the HeNB and any other HeNB or eNB which has overlapping coverage. The synchronization requirement shall be set to 3 us in all cases, except when the HeNB gets its synchronization when performing network listening off cells with propagation distance greater than. This requirement shall apply independent of the synchronization technique used (global positioning system (GPS), institute of electrical and electronics engineers (IEEE) 1588v2, network listening). In scenarios where synchronization is obtained via network listening off cells with propagation distance greater than, the synchronization requirement shall be 1.33 us plus the propagation delay between the HeNB and the cell selected as the network listening synchronization source (e.g., when the propagation distance is, the synchronization requirement is 10 us). In terms of the network listening synchronization source selection, the best accurate synchronization source to global navigation satellite system (GNSS) should be selected.

Network listening is a useful technique which can be utilized when other techniques such as global positioning system (GPS) or institute of electrical and electronics engineers (IEEE) 1588v2 are not available. Some enhancements to support efficient network listening mechanisms may be required.

SUMMARY OF INVENTION

Technical Problem

The present invention provides a method and apparatus for supporting a network listening in a wireless communication system. The present invention provides potential enhancement on advanced user equipments (UEs) when network listening is used along with enhancement to improve channel condition such as coordinated muting or enhanced reference signal (RS) design.

Solution to Problem

In an aspect, a method for supporting, by a user equipment (UE), a network listening in a wireless communication system is provided. The method includes receiving a subframe configuration used for the network listening, and monitoring subframes indicated as subframes used for radio interface based synchronization (RIBS) by the received subframe configuration.

The subframe configuration used for the network listening may be a second multicast broadcast single frequency network (MBSFN) subframe configuration for the network listening, which overrides a first MBSFN configuration for MBSFN configuration.

The subframe configuration used for the network listening may be a subframe configuration for a time division duplex (TDD) frame, and the subframes indicated as subframes used for RIBS are special subframes in the TDD frame. Monitoring subframes indicated as subframes used for RIBS may comprise monitoring a guard period in the subframes indicated as subframes used for RIBS.

In another aspect, a user equipment (UE) configured to support a network listening in a wireless communication system is provided. The UE includes a radio frequency (RF) unit configured to transmit or receive a radio signal, and a processor coupled to the RF unit, and configured to receive a subframe configuration used for the network listening, and monitor subframes indicated as subframes used for radio interface based synchronization (RIBS) by the received subframe configuration.

Advantageous Effects of Invention

Efficient network listening mechanisms can be supported. Further, network synchronization accuracy can be enhanced.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 12 shows an example of dual connectivity to a macro cell and small cell.
FIG. 13 shows an example of synchronization using network listening.
FIG. 14 shows another example of synchronization using network listening.
FIG. 15 shows an example of muting pattern per stratum level.
FIG. 16 shows an example of a muting pattern according to an embodiment of the present invention.
FIG. 17 shows another example of a muting pattern according to an embodiment of the present invention.
FIG. 18 shows an example of allocating more subframes for higher stratum level according to an embodiment of the present invention.
FIG. 19 shows an example of a method for performing a network listening according to an embodiment of the present invention.
FIG. 20 is a block diagram showing wireless communication system to implement an embodiment of the present invention.

MODE FOR THE INVENTION

Figure 6:
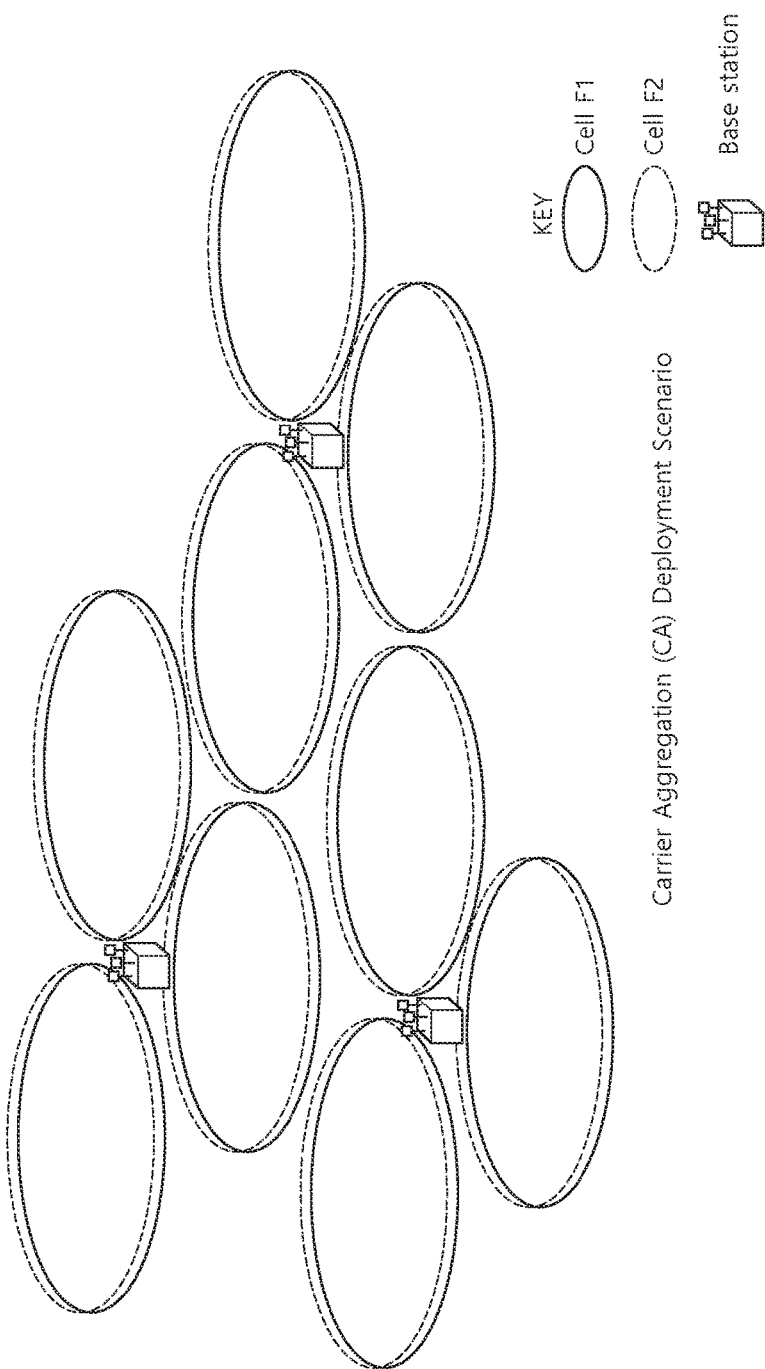
FIG. 6 shows an example of a potential deployment scenario for CA.

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbols may be called by other names depending on a multiple-access scheme. For example, when SC-FDMA is in use as an uplink multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

FIG. 3 shows a resource grid for one downlink slot. Referring to FIG. 3, a downlink slot includes a plurality of OFDM symbols in time domain. It is described herein that one downlink slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number NAL of RBs included in the downlink slot depends on a downlink transmit bandwidth. The structure of an uplink slot may be same as that of the downlink slot.

The number of OFDM symbols and the number of subcarriers may vary depending on the length of a CP, frequency spacing, etc. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDCCH). Examples of downlink control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/non-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

FIG. 5 shows structure of an uplink subframe. Referring to FIG. 5, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting uplink control information through different subcarriers according to time.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to a UL-SCH, a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Carrier aggregation (CA) is described. When the CA is configured, the UE only has one radio resource control (RRC) connection with the network. At RRC connection establishment/re-establishment, one serving cell provides security input and non-access stratum (NAS) mobility information, similarly as in 3GPP LTE Rel-8/9. This cell is referred to as a primary serving cell (PCell). Further, depending on UE capabilities, secondary serving cells (SCells) can be configured to form together with the PCell a set of serving cells.

Deployment scenarios for CA are described. It may be referred to Annex J.1 of 3GPP TS 36.300 V11.1.0 (2012-03). In 3GPP LTE Rel-10, for the uplink, the focus is laid on the support of intra-band carrier aggregations (e.g., scenarios described below in FIGS. 6, 7, and 8 when F1 and F2 are in the same band). For the downlink, all scenarios should be supported in 3GPP LTE Rel-10.

FIG. 6 shows an example of a potential deployment scenario for CA. Referring to FIGS. 6, F1 and F2 cells are co-located and overlaid, providing nearly the same coverage. Both layers provide sufficient coverage and mobility can be supported on both layers. Likely scenario is when F1 and F2 are of the same band, e.g., 2 GHz, 800 MHz, etc. It is expected that aggregation is possible between overlaid F1 and F2 cells.

Figure 7:
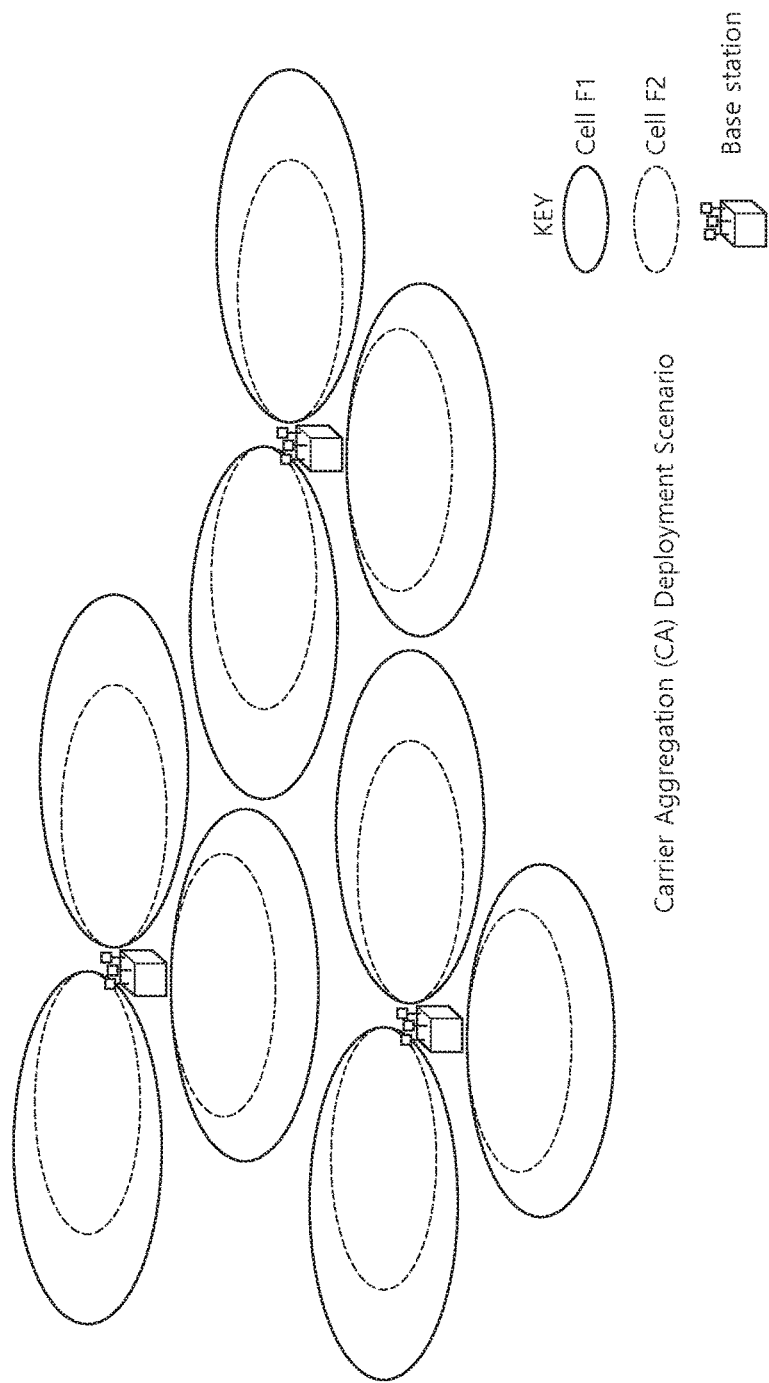
FIG. 7 shows another example of a potential deployment scenario for CA.

FIG. 7 shows another example of a potential deployment scenario for CA. F1 and F2 cells are co-located and overlaid, but F2 has smaller coverage due to larger path loss. Only F1 provides sufficient coverage and F2 is used to improve throughput. Mobility is performed based on F1 coverage. Likely scenario when F1 and F2 are of different bands, e.g., F1={800 MHz, 2 GHz} and F2={3.5 GHz}, etc. It is expected that aggregation is possible between overlaid F1 and F2 cells.

Figure 8:
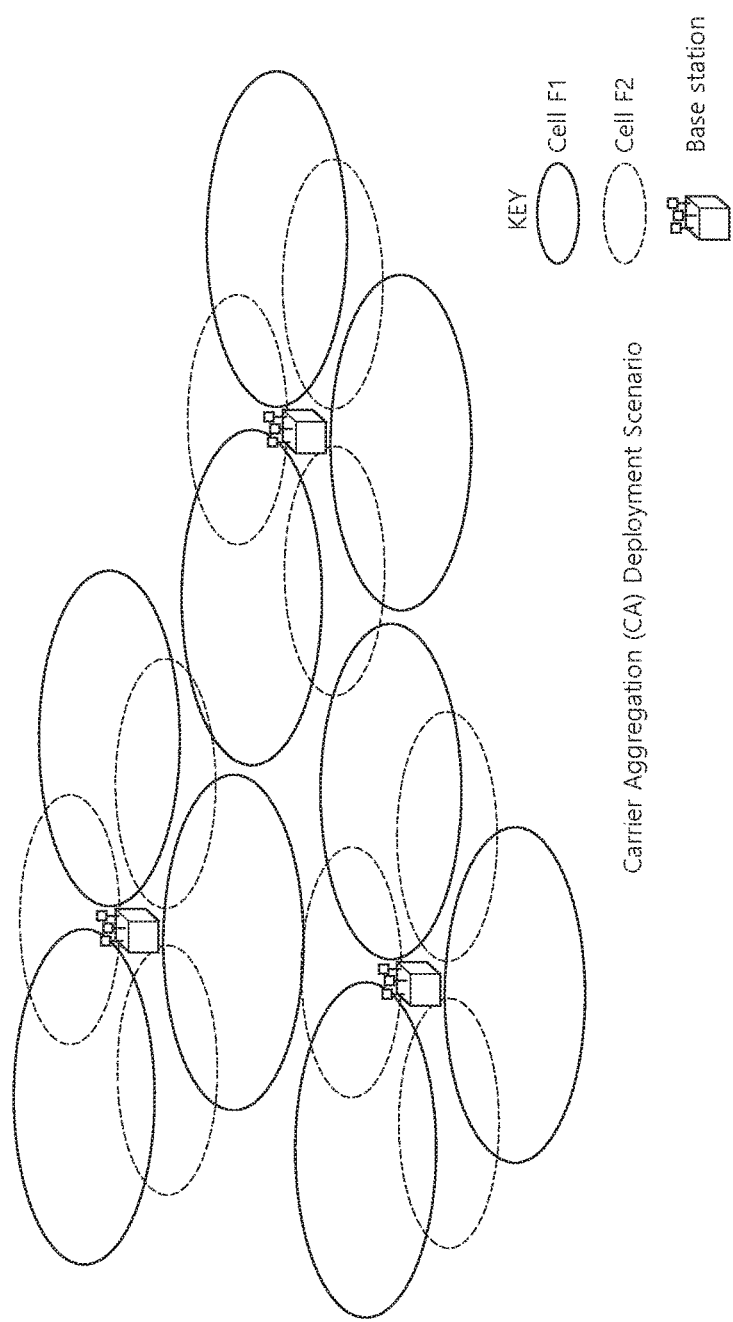
FIG. 8 shows another example of a potential deployment scenario for CA.

FIG. 8 shows another example of a potential deployment scenario for CA. F1 and F2 cells are co-located but F2 antennas are directed to the cell boundaries of F1 so that cell edge throughput is increased. F1 provides sufficient coverage but F2 potentially has holes, e.g., due to larger path loss. Mobility is based on F1 coverage. Likely scenario is when F1 and F2 are of different bands, e.g., F1={800 MHz, 2 GHz} and F2={3.5 GHz}, etc. It is expected that F1 and F2 cells of the same eNB can be aggregated where coverage overlaps.

Figure 9:
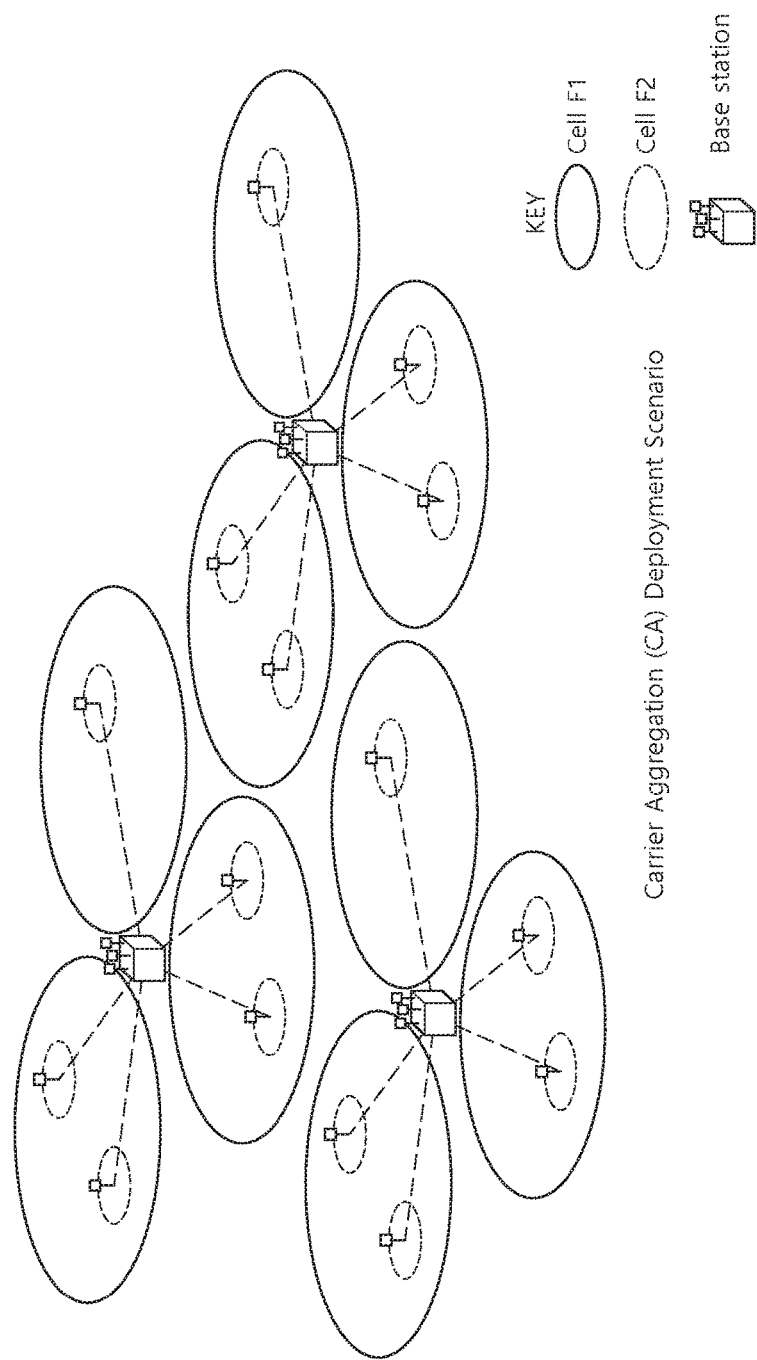
FIG. 9 shows another example of a potential deployment scenario for CA.

FIG. 9 shows another example of a potential deployment scenario for CA. F1 provides macro coverage and on F2 remote radio heads (RRHs) are used to improve throughput at hot spots. Mobility is performed based on F1 coverage. Likely scenario is when F1 and F2 are of different bands, e.g., F1={800 MHz, 2 GHz} and F2={3.5 GHz}, etc. It is expected that F2 RRHs cells can be aggregated with the underlying F1 macro cells.

Figure 10:
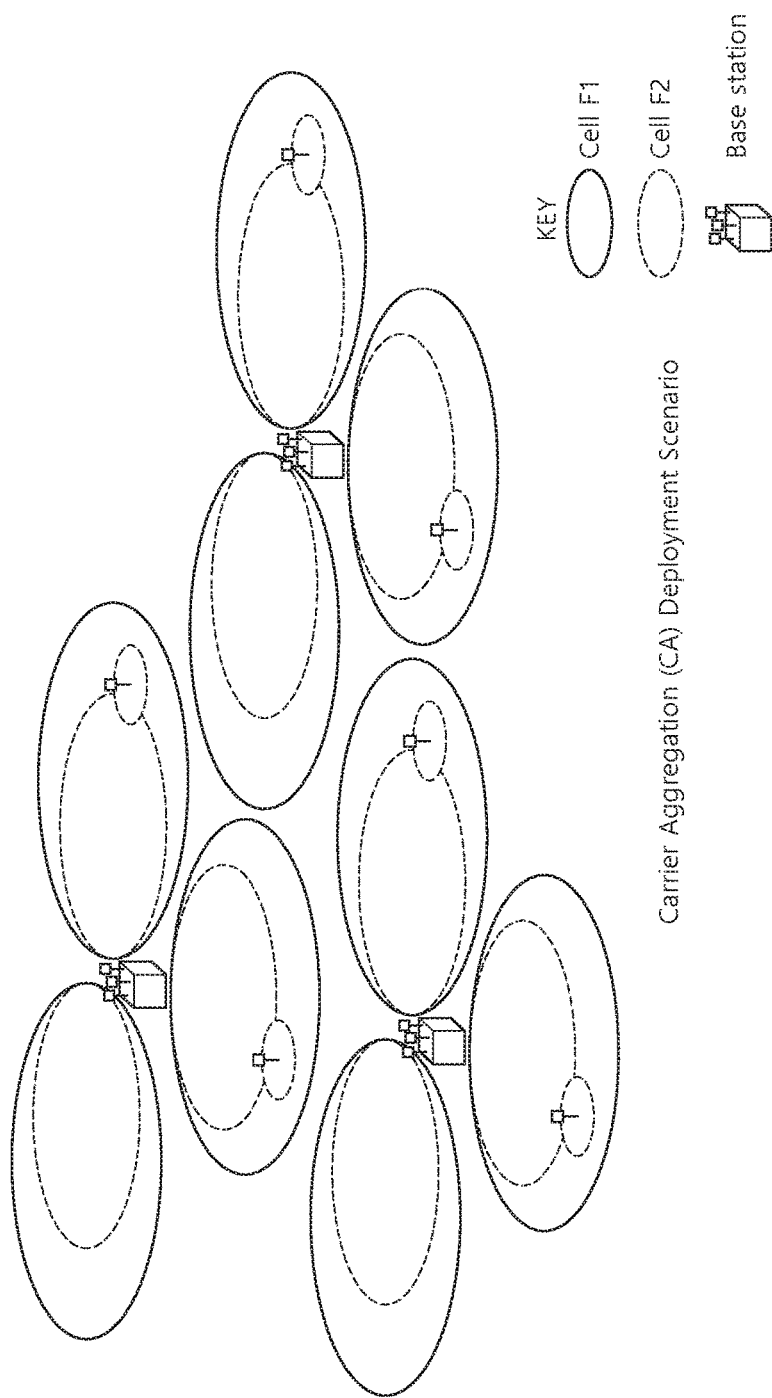
FIG. 10 shows another example of a potential deployment scenario for CA.

FIG. 10 shows another example of a potential deployment scenario for CA. It is similar to the scenario described in FIG. 7, but frequency selective repeaters are deployed so that coverage is extended for one of the carrier frequencies. It is expected that F1 and F2 cells of the same eNB can be aggregated where coverage overlaps.

The reception timing difference at the physical layer of DL assignments and UL grants for the same TTI but from different serving cells (e.g., depending on number of control symbols, propagation and deployment scenario) does not affect media access control (MAC) operation. When CA is deployed frame timing, superframe number (SFN) and TDD-Config are aligned across cells that can be aggregated.

Activation/deactivation of SCells is described. It may be referred to Section 5.13 of 3GPP TS 36.321 V11.1.0 (2012-12). If the UE is configured with one or more SCells, the network may activate and deactivate the configured SCells. The PCell is always activated. The network activates and deactivates the SCell(s) by sending the activation/deactivation MAC control element. Furthermore, the UE maintains a sCellDeactivationTimer timer per configured SCell and deactivates the associated SCell upon its expiry. The same initial timer value applies to each instance of the sCellDeactivationTimer and it is configured by RRC. The configured SCells are initially deactivated upon addition and after a handover.

The UE shall for each TTI and for each configured SCell:
1> if the UE receives an Activation/Deactivation MAC control element in this TTI activating the SCell, the UE shall in the TTI according to the timing:
2> activate the SCell; i.e., apply normal SCell operation including:
3> SRS transmissions on the SCell;
3> CQI/PMI/RI/PTI reporting for the SCell;
3> PDCCH monitoring on the SCell;
3> PDCCH monitoring for the SCell
2> start or restart the sCellDeactivationTimer associated with the SCell;
1> else, if the UE receives an Activation/Deactivation MAC control element in this TTI deactivating the SCell; or
1> if the sCellDeactivationTimer associated with the activated SCell expires in this TTI:
2> in the TTI according to the timing:
3> deactivate the SCell;
3> stop the sCellDeactivationTimer associated with the SCell;
3> flush all HARQ buffers associated with the SCell.

1> if PDCCH on the activated SCell indicates an uplink grant or downlink assignment; or 1> if PDCCH on the Serving Cell scheduling the activated SCell indicates an uplink grant or a downlink assignment for the activated SCell:

2> restart the sCellDeactivationTimer associated with the SCell;

1> if the SCell is deactivated:

2> not transmit SRS on the SCell;

2> not report CQI/PMI/RI/PTI for the SCell;

2> not transmit on UL-SCH on the SCell;

2> not transmit on RACH on the SCell;

2> not monitor the PDCCH on the SCell;

2> not monitor the PDCCH for the SCell.

Small cell enhancement is described. It may be referred to 3GPP TR 36.932 V12.0.0 (2012-12).

Figure 11:
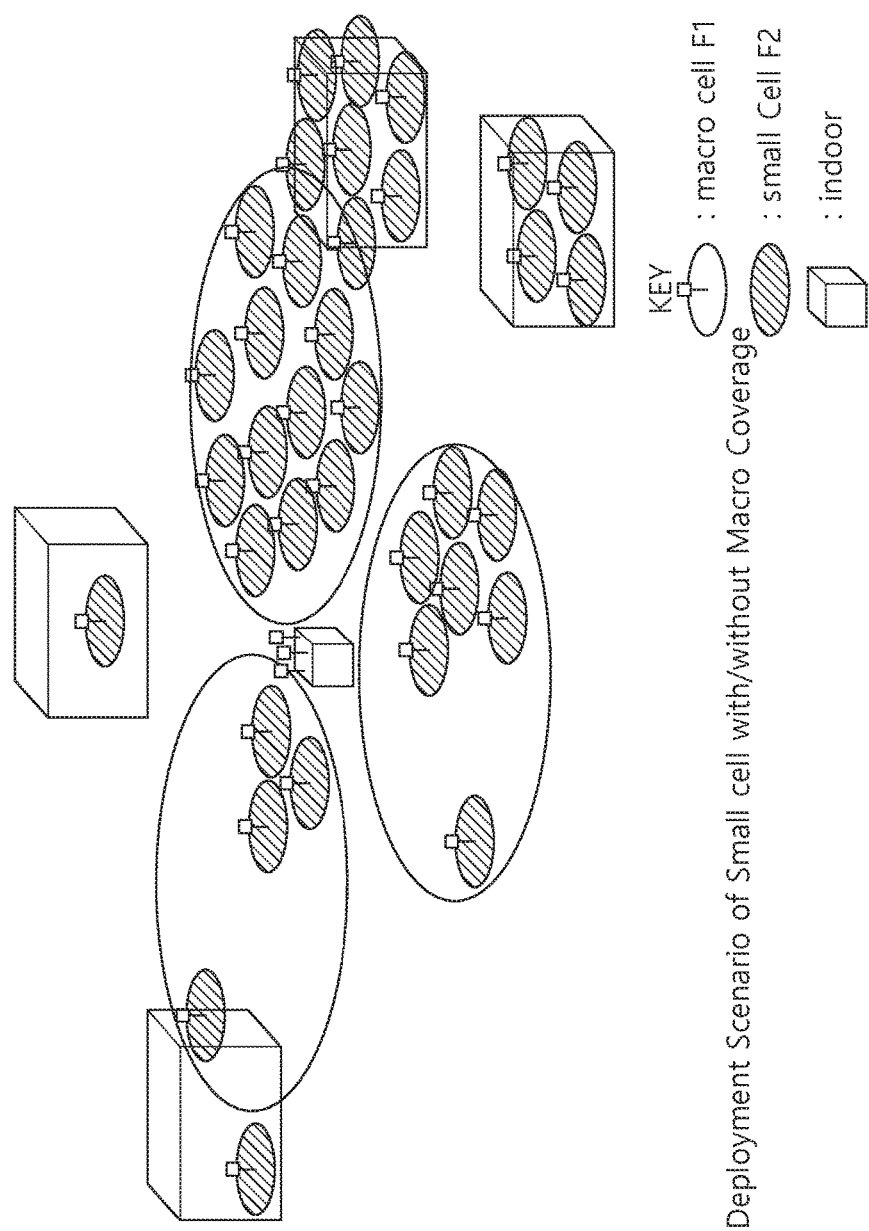
FIG. 11 shows deployment scenarios of small cells with/without macro coverage.

FIG. 11 shows deployment scenarios of small cells with/without macro coverage. Small cell enhancement should target both with and without macro coverage, both outdoor and indoor small cell deployments and both ideal and non-ideal backhaul. Both sparse and dense small cell deployments should be considered.

Referring to FIG. 11, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:

where the UE is in coverage of both the macro cell and the small cell simultaneously where the UE is not in coverage of both the macro cell and the small cell simultaneously.

Also, the deployment scenario where small cell nodes are not deployed under the coverage of one or more overlaid E-UTRAN macro-cell layer(s) may be considered.

FIG. 12 shows an example of dual connectivity to a macro cell and small cell. Referring to FIG. 12, an MeNB stands for a master eNB (or, a macro cell eNB), and an SeNB stands for a secondary eNB (or, a small cell eNB). The UE has a connection with the MeNB in frequency f1. In dual connectivity, the MeNB controls the macro cell, and is the eNB which terminates at least S1-MME and therefore act as mobility anchor towards the core network (CN). Also, the UE has a connection with the SeNB in frequency f2. In dual connectivity, the SeNB controls one or more small cells, and is the eNB providing additional radio resources for the UE, which is not the MeNB. Accordingly, the UE may receive control signaling from the MeNB, and may receive data from the SeNB. The interface between the MeNB and SeNB is called an Xn interface. The Xn interface is assumed to be non-ideal backhaul. For example, delay in the Xn interface could be up to 60 ms.

Table 1 shows the information element (IE) SPS-Config. The IE SPS-Config is used to specify the semi-persistent scheduling (SPS) configuration.

TABLE 1

```
-- ASN1START
SPS-Config ::= SEQUENCE {
    semiPersistSchedC-RNTI C-RNTI OPTIONAL, -- Need OR
    sps-ConfigDL SPS-ConfigDL OPTIONAL, -- Need ON
    sps-ConfigUL SPS-ConfigUL OPTIONAL -- Need ON
}
SPS-ConfigDL ::= CHOICE{
    Release NULL,
    Setup SEQUENCE {
        semiPersistSchedIntervalDL ENUMERATED {
            sf10, sf20, sf32, sf40, sf64, sf80,
            sf128, sf160, sf320, sf640, spare6,
            spare5, spare4, spare3, spare2,
            spare1},
        numberOfConfSPS-Processes INTEGER (1..8),
        n1PUCCH-AN-PersistentList N1PUCCH-AN-PersistentList,
        ...,
        [[ twoAntennaPortActivated-r10 CHOICE {
            Release NULL,
            Setup SEQUENCE {
                n1PUCCH-AN-PersistentListP1-r10 N1PUCCH-AN-PersistentList
            }
        } OPTIONAL -- Need ON
        ]]
    }
}
SPS-ConfigUL ::= CHOICE {
    Release NULL,
    setup SEQUENCE {
        semiPersistSchedIntervalUL ENUMERATED {
            sf10, sf20, sf32, sf40, sf64, sf80,
            sf128, sf160, sf320, sf640, spare6,
            spare5, spare4, spare3, spare2,
            spare1},
        implicitReleaseAfter ENUMERATED {e2, e3, e4, e8},
        p0-Persistent SEQUENCE {
            p0-NominalPUSCH-Persistent INTEGER (-126..24),
            p0-UE-PUSCH-Persistent INTEGER (-8..7)
        } OPTIONAL, -- Need OP
        twoIntervalsConfig ENUMERATED {true} OPTIONAL, -- Cond TDD
        ...
    }
}
N1PUCCH-AN-PersistentList ::= SEQUENCE (SIZE (1..4)) OF
    INTEGER (0..2047)
-- ASN1STOP
```

PDCCH validation for SPS is described. It may be referred to Section 9.2 of 3GPP TS 36.213 V10.2.0 (2011-06). A UE shall validate a SPS assignment PDCCH only if all the following conditions are met:

the CRC parity bits obtained for the PDCCH payload are scrambled with the SPS cell radio network temporary identity (C-RNTI)

the new data indicator field is set to '0'. In case of DCI formats 2, 2A, 2B and 2C, the new data indicator field refers to the one for the enabled transport block.

Validation is achieved if all the fields for the respective used DCI format are set according to Table 2 or Table 3 described below. If validation is achieved, the UE shall consider the received DCI information accordingly as a valid SPS activation or release. If validation is not achieved, the received DCI format shall be considered by the UE as having been received with a non-matching CRC.

Table 2 shows special fields for SPS activation PDCCH validation.

TABLE 2

|  | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 3 shows special fields for SPS release PDCCH validation.

TABLE 3

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

For the case that the DCI format indicates a semi-persistent downlink scheduling activation, the TPC command for PUCCH field shall be used as an index to one of the four PUCCH resource values configured by higher layers, with the mapping defined in Table 4.

TABLE 4

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

Synchronization using network listening is described. It may be referred to Section 6.4.2.1 of 3GPP TR 36.922 V11.0.0 (2012-09). The technique in which a home eNB (HeNB) derives its timing from a synchronized eNB or HeNB (which in turn may be global navigation satellite system (GNSS)-synchronized) is referred to here as "synchronization using network listening".

FIG. 13 shows an example of synchronization using network listening. A HeNB that uses network listening (HeNB1 in FIG. 13) may utilize a synchronization or reference signal from another eNB (sync eNB in FIG. 13) to derive its timing. Such single hop synchronization for HeNB is the most common case under good macro coverage.

FIG. 14 shows another example of synchronization using network listening. When a HeNB cannot acquire synchronization from a primary synchronization source (an eNB or HeNB with GNSS synchronization) then multiple hops may be supported. In FIG. 14, HeNB2 acquires synchronization from HeNB1 which in turn acquires synchronization from sync eNB.

In the case of multi-hop synchronization, the concept of synchronization stratum may be introduced. The synchronization stratum of a particular HeNB is defined as the smallest number of hops between the HeNB and the GPS source. It should be noted that the synchronization stratum of a particular HeNB is one greater than its donor (H)eNB, i.e., the (H)eNB that it is tracking. In FIG. 13 and FIG. 14, sync eNB has stratum 0, HeNB1 has stratum 1 and HeNB2 has stratum 2.

The HeNB may periodically track one or more signals from the donor cell (e.g., primary synchronization signal (PSS), secondary synchronization signal (SSS), common reference signal (CRS), positioning reference signal (PRS)) to maintain its synchronization. Tracking the PSS and SSS may come at the cost of some backward compatibility since a HeNB would need to shut down its PSS/SSS transmission to monitor the PSS/SSS of the donor (H)eNB. Two fully backward compatible schemes for tracking the CRS have been proposed, one that uses multicast broadcast single frequency network (MBSFN) subframes and one that uses the guard period between DL and UL transmission.

The HeNB should be aware of its neighbors' synchronization hierarchy (stratum information), and then correspondingly decide its own stratum number. Also, the HeNB needs to let others know its own synchronization status and stratum information. For this, blind detection scheme for indication of stratum level and synchronization status may be proposed. It is assumed that the blind detection scheme is described below in the context of the MBSFN-subframe based scheme.

Blind detection scheme may fulfill the convey requirement for stratum information and synchronization status without signaling when the operations, administration and management (OAM) configures or all HeNBs embedded pre-configure the same muting places (e.g., MBSFN subframes) for a given value of stratum and status, while configures different muting places for other values of stratum and status. Optional OAM signaling of MBSFN subframes as a function of stratum is available. If with all HeNBs embedded pre-configuration, then it is no need to send the OAM signaling. For blind detection, all HeNBs should well know the mapping relationship of each stratum and its muting place, here one instance of the muting place may be subframes declared as MBSFN for this stratum.

FIG. 15 shows an example of muting pattern per stratum level. Each small cell transmits RS for network listening and others will do muting to reduce interference. Referring to FIG. 15, HeNB stratum 1 may trace CRS in subframe #2 of radio frame #1. HeNB stratum 2 may trace CRS of HeNB stratum subframe #2 of radio frame #2, and also mute to avoiding interference to HeNB stratum 1 in subframe #2 of radio frame #1. This muting may be omitted if power control is appropriately utilized then interference will be mitigated. Similar ruling is taken to the following strata.

The HeNB do blind detection for the existence of CRS on muting place for all possible stratum (normally on booting stage) and contrast the mapping table to recognize the strata of its surrounding base stations, and basing some strategy to decide its synchronization source, thus also decide its own stratum and muting place.

On normal working, the HeNB execute network listening on its specific muting place according stratum, while that is also indicating its stratum and synchronization information for new booted neighbor who is doing blind detection.

Periodically, this HeNB may reserve all muting places for one or several rounds, and detect whether any change occurs which may impact its stratum, e.g., synchronization source node shutting down or new node booting up providing lower stratum than current source, and adapt its own stratum accordingly. Non-GNSS synchronized stratum and GNSS synchronized stratum can be differentiated if different muting places are used for the two which can ensure smooth stratum change between both types.

Hereinafter, a set of scenarios where network listening may be applied and enhancement to support efficient network listening mechanisms according to embodiments of the present invention are described. Some of candidate techniques to enhance network synchronization accuracy according to the embodiments of the present invention include coordinated muting via MBSFN subframe configurations or guard period (in TDD) or other enhanced of existing RS such as channel state information reference signal (CSI-RS) or CRS with muting.

First, coordinated muting technique using MBSFN subframe according to an embodiment of the present invention is described. For subframes assigned for either transmission of network listening RS (hereinafter, radio interface based synchronization reference signal (RIBS-RS)) or for muting to protect RIBS-RS, impact on the UEs should be considered. For coordinated muting, two overall approaches, one of which is configuring MBSFN subframe on those subframes such that the UE may not expect to receive any data, and the other is using guard period available in TDD mode, may be considered. Considering that the RIBS-RS will be transmitted rather occasionally instead of frequently, configuring semi-static MBSFN subframe configuration or short guard period may have impact on UE throughput. With MBSFN subframe configuration, subframes not used for network listening may be used with transmission mode (TM) 9/10 configured UEs limitedly. However, still, it does not support UEs with CRS-based TM configured. For example, the RIBS-RS may be transmitted in every 10 s where MBSFN configuration may assign one MBSFN subframe for network listening in every 320 ms. In this case, the overhead would be approximately 30 subframes per one interval of network listening. This may not be avoidable for legacy UEs since legacy UEs cannot be configured with new scenario.

However, for advanced UEs, multiple approaches may be considered to enhance the situation. First, according to an embodiment of the preset invention, another MBSFN subframe configuration for advanced UE which overrides the MBSFN subframe configuration may be configured. Another MBSFN subframe configuration may be given by SIB for advanced UEs. This MBSFN configuration may have longer period to be used for network listening technique. Alternatively, separate MBSFN subframe configuration may be also configured either for network listening purpose or for real MBSFN configuration for advanced UEs. If the separate MBSFN configuration is assumed for network listening, the performance of legacy UEs is expected at subframes used for network listening, as legacy signals may not be transmitted in those subframes.

Secondly, using guard period in special subframe, similar approaches may be considered as well. One approach is to configure short special subframe and then use muting and transmitting of RIBS-RS in guard periods of those special subframes. This approach obviously degrades the user throughput as special subframe has small number of available downlink pilot time slot (DwPTS) symbols. In this case, other subframes not used for network listening may be indicated to advanced UEs along with guard period duration so that advanced UEs may have longer DwPTS. Another approach is to configure short guard period and allow potentially performance degradation of legacy UEs periodically which are used for network listening. In this case, the subframe where short CP is used for muting and/or transmitting RIBS-RS may be indicated to advanced UEs to avoid performance degradation of advanced UEs.

Another approach may be to use restricted measurement set configuration where subframes not configured for the restricted measurement set may be used for network listening purpose where muting may be occurred. However, this approach does not support Rel-10 below UEs which do not support restricted measurement. Thus, some performance loss on those UEs may be expected.

Another approach is to use rate matching around RIBS-RS and muting REs. In this case, to support legacy UEs, it may be assumed that RIBS-RS is transmitted only in PDSCH region and also muting is occurred in PDSCH region only. For example, if CRS is used for RIBS-RS, muting may be achieved by rate matching around CRS used for network listening. If cell 1 is a transmitter in a subframe, CRS position for cell 1 may be rate-matched by other muting cells. When muting occurs, data transmission to legacy UEs may not be occurred. On the other hand, data transmission to advanced UE with proper signaling may be considered such as rate matching information of CRS REs. This may be achieved by signaling coordinated muting pattern and the cell ID list. Or, the muting pattern may be configured and be triggered by DCI dynamically. For example, one muting pattern may mute all symbols which carry CRS except for the CRS transmitted from the cell itself. A UE may be configured with this muting pattern and the rate matching may be triggered by DCI or a set of subframes where the muting occurs may be semi-statically configured.

FIG. 16 shows an example of a muting pattern according to an embodiment of the present invention. Referring to FIG. 16, CRS is used for RIBS-RS, and all REs in the symbol which carry the CRS except for the CRS RE are muted. Further, rate matching around the CRS is also performed.

If CRS RE positions need to be muted as well, CRS-based TM may not be supported. In those cases, configuring MBSFN subframe for those muted subframe would be desirable along with indication of muting pattern in those CRS OFDM symbols. In other words, if data is scheduled in muting subframe to advanced UEs, rate matching pattern may be indicated/configured to the UE so that proper muting can be achieved.

Another approach is to use PRS, as PRS density is high. In this case (as well for CRS), Vshift may be used to indicate stratum level of the transmitter. If PRS is used, PDSCH region should be muted for the PRBs used for PRS transmission except for OFDM symbols carrying CRS. By not scheduling any data, muting may be easily achievable.

Another approach is to use CSI-RS along with muting (zero power (ZP)-CSI) with proper configuration. The configuration used for CSI-RS transmission may be tied with stratum level so that by receiving CSI-RS, the receiving eNB may determine transmitter's stratum level. Additional signaling may be necessary to determine ZP-CSI which may have longer period then currently specified.

Meanwhile, in TDD, there is TDD DL/UL configuration 0 which does not have usable downlink subframes except for subframes #0/#1/#5/#6 where subframes #1/#6 are special subframes and subframes #0/#5 are carrying SSS. In this case, only subframe #5 may be usable with PRS transmission by not transmitting PRS in the last OFDM symbol. When PRS is used, regardless whether the corresponding subframe is MBSFN subframe or not, the CP is assumed to be the same as that of the first subframe. Accordingly, in TDD, coordinated muting may be done by using guard period or uplink subframe or UpPTS.

FIG. 17 shows another example of a muting pattern according to an embodiment of the present invention. Referring to FIG. 17, a TDD frame is configured by TDD DL/UL configuration 1 for SeNB1/SeNB2. Uplink subframes are used for coordinated muting. That is, small cell eNB1, which has stratum level 1, transmits the RIBS-RS in subframe #2, which is an uplink subframe. Small cell eNB2, which has stratum level 2, transmits the RIBS-RS in subframe #3, which is an uplink subframe, while the small cell eNB2 mutes in subframe #2.

To read downlink RS from the transmitter, other small cells may have to mute (which may be in different stratum levels), and thus the configuration of those eNBs may be desirable to use uplink instead of downlink. However, those subframe needs to be carefully scheduled not to incur additional interference. From the perspective of the transmitter, even though the configuration is for uplink subframe (downlink subframe configuration may not work due to inter-cell interference from different up/down directions if that subframe is configured for downlink for the transmitter whereas uplink for other muting cells), the transmitter may transmit downlink signal in the corresponding subframe. Thus, this "occasional" downlink subframes may be indicated to advanced UEs such that advanced UEs can receive data in those subframes.

Furthermore, those subframes used for coordinated muting may be used for downlink regardless that transmitting or muting the serving cell is performed if muting occurs only for the RIBS-RS REs. In that case, the subframes along with rate matching pattern may be signaled to advanced UEs so that downlink data scheduling may occur in those subframes. This may be easily achievable by enhanced interference mitigation and traffic adaptation (eIMTA) as the configuration of changing those subframes (e.g., DSDDDDSUUD as in the example) is not specified as a candidate TDD DL/UL configuration and occurs only once in a while. Thus, separate semi-static configuration to advanced UEs to utilize those subframes may be needed.

Determining stratum level according to an embodiment of the present invention is described. Determining of stratum level may be achieved by coordinated muting pattern where a transmitter of a specific stratum level will transmit its signals following a given pattern for that stratum level. Alternatively, a set of subframes used for network listening may be allocated, and accordingly, the eNB may either transmit or receive at those subframes. When signal is transmitted, stratum level may be conveyed via either different OFDM symbol or different Vshift. To avoid collision between eNBs sharing the same stratum level, cell ID may be used to determine subframe to transmit signal. For example, within one period of network listening, if there are 10 available subframes for network listening, cells with cell ID % 10=0 may transmit RIBS-RS in the first subframe, cells with cell ID % 10=1 may transmit RIBS-RS in the second subframe, and so on. The subframes used for network listening may be predetermined such as first #5 subframe in every 200 ms aligned with a reference eNB (such as overlaid macro eNB).

Further, it is likely that higher reliability/hearability is required as the stratum level increases to achieve tighter synchronization accuracy. To increase the reliability, two ways may be used generally. First way is to increase the power, which however increases the interference to potentially the cells with same stratum level and also to neighboring clusters or cells. Second way is to increase the density of RIBS-RS, which has similar impact to power increase and thus to make orthogonal transmission, a type of TDM may be necessary. In either way, it is important to have orthogonal transmission of RIBS-RS among cells with the same stratum level, particularly for cells with high stratum level. One way to increase orthogonality is to allocate more subframes used for higher stratum level.

FIG. 18 shows an example of allocating more subframes for higher stratum level according to an embodiment of the present invention. Referring to FIG. 18, more subframes are allocated with higher stratum level. Specifically, subframes may be allocated proportional to stratum level or increase with 2 times compared to previous stratum level in every stratum level or other ratio. In FIG. 18, subframe for stratum level 0 and 1 are allocated once in every RIBS cycle, subframe for stratum level 2 are allocated twice in every RIBS cycle, and subframe for stratum level 3 are allocated four times in every RIBS cycle.

In terms of transmitting RIBS-RS, either all subframes may be used for transmission so that reliability of RIBS-RS is increased with high stratum level or one subframe out of potentially many subframes may be selected based on cell ID or other ID in order to improve orthogonality between RIBS-RS transmissions from cells with the same stratum level.

If the coordinated muting pattern according to an embodiment of the present invention is used, a UE, if indicated with "RIBS enabling", assumes that the serving cell may perform muting in those subframes. The knowledge of coordinated muting pattern by the UE may be used for proper data decoding and uplink scheduling (if uplink subframe is configured for RIBS subframe, the UE may not transmit uplink transmission in those subframes unless explicitly scheduled with PUSCH). When coordinated muting is used, cells may perform muting in all subframes assigned for network listening (within a cluster or within a overlaid macro coverage) except for the subframes for transmission. This is to remove interference in a dense small cell scenario.

To support this, network or clock source may determine maximum supportable stratum level and the size of network listening cycle and inform this to the participating cells. If no information is available, default value may be assumed, such as 6 as the maximum number and 10 s as the interval. Starting radio frame may be aligned with SFN of the clock source.

Further, if network listening is accomplished other than PSS/SSS, cell ID detection may need some assistance information. At least, a list of cell IDs to look up needs to be informed to each cell. This may be done also via cell discovery among cells by reading PSS/SSS, for example.

Further, stratum level of each cell may indirectly refer potentially synchronization error compared to the reference clock source. For example, when dual connectivity is supported and small cells are synchronized against the overlaid macro cell, stratum level of a small cell may indirectly mean synchronization inaccuracy from the macro cell. When network assisted discovery signal design is used for small cell discovery (such as CSI-RS), this inaccuracy may also impact on the measurement accuracy. Thus, when a UE selects a cell, the stratum level information may be used along with measurement reports. Or, the network may use the stratum level information in the selection of a cell along with measurement reports from the UE. If the UE determines the cell, stratum level may be informed to the UE such as via higher layer signaling or discovery by reading stratum level of RIBS-RS of the cell. One example may be to assume that a cell with stratum level larger than a threshold (e.g., 3) may be assumed as potentially unsynchronized cell and thus measurement accuracy is assumed to be high.

In addition to stratum level, synchronous state may be also used for cell detection where asynchronous cell may not be selected with high priority than synchronous status cells. When frequency synchronization is achieved via network listening, stratum level plays an important role such that high stratum level means very inaccurate frequency synchronization in general. Thus, when selecting a cell with inaccurate frequency synchronization, the target or threshold of selection quality may be increased for that cell. In other words, cell selection satisfactory criteria for inaccurately frequency synchronized cells should become tighter.

FIG. 19 shows an example of a method for performing a network listening according to an embodiment of the present invention. In step S100, the UE receives a subframe configuration used for the network listening. In step S110, the UE monitors subframes indicated as subframes used for RIBS by the received subframe configuration.

The subframe configuration used for the network listening may be a second MBSFN subframe configuration for the network listening, which overrides a first MBSFN configuration for MBSFN configuration. In this case, the second MBSFN subframe configuration may configure MBSFN subframes with a longer period than the first MBSFN subframe configuration. The second MBSFN subframe configuration may be given by a SIB. Alternatively, the subframe configuration used for the network listening may be a subframe configuration for a TDD frame, and the subframes indicated as subframes used for RIBS may be special subframes in the TDD frame. Monitoring subframes indicated as subframes used for RIBS may comprise monitoring a guard period in the subframes indicated as subframes used for RIBS.

Further, the UE may further receive a RIBS reference signal (RIBS-RS) in the subframes indicated as subframes used for RIBS. The RIBS-RS may be one of a CRS, a PRS, a CSI RS, or a newly defined reference signal for the network listening.

Further, the subframes indicated as subframes used for RIBS may be configured for each of a plurality of cells, which have different stratum levels from each other. A number of the subframes configured for a cell having a higher stratum level may be larger than a number of the subframes configured for a cell having a lower stratum level. For example, the subframes may be configured proportional to a stratum level, or configured by being increased with 2 times compared to a previous stratum level in every stratum level.

FIG. 20 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for supporting, by a user equipment (UE), a network listening in a wireless communication system, the method comprising:
   receiving a subframe configuration used for the network listening;
   monitoring a plurality of subframes indicated by the received subframe configuration,
   wherein the plurality of subframes are used for receiving a reference signal (RS) for a synchronization;
   receiving the RS for the synchronization,
   wherein the RS for the synchronization is received in a subframe configured for the network listening among the plurality of subframes,
   wherein signals of the subframe are muted except for the RS for the synchronization,
   wherein the RS for the synchronization is received only in a physical downlink shared channel (PDSCH) region of the plurality of subframes, and the muting of the signals of the subframe also occurs in the PDSCH region of the plurality of subframes, and
   wherein the muting of the signals is performed according to a muting pattern, which is configured and triggered by downlink control information (DCI);
   performing the synchronization based on the RS for the synchronization,
   wherein the synchronization is performed based on stratum levels of cells,
   wherein a density of the RS is increased in order to increase a reliability with a higher stratum level, and
   wherein the subframes are configured proportional to a stratum level in order to have an orthogonal transmission of the RS among cells with same stratum level; and
   receiving or transmitting data at a timing based on the synchronization.

2. The method of claim 1, wherein the subframe configuration used for the network listening is a second multicast broadcast single frequency network (MBSFN) subframe configuration for the network listening, which overrides a first MBSFN subframe configuration for a MBSFN configuration.

3. The method of claim 2, wherein the second MBSFN subframe configuration configures MBSFN subframes with a longer period than the first MBSFN subframe configuration.

4. The method of claim 2, wherein the second MBSFN subframe configuration is given by a system information block (SIB).

5. The method of claim 1, wherein the subframe configuration used for the network listening is a subframe configuration for a time division duplex (TDD) frame.

6. The method of claim 1, wherein the RS for the synchronization is received at a guard period of a special subframe.

7. The method of claim 1, wherein the RS is one of a cell-specific reference signal (CRS), a positioning reference signal (PRS), or a channel state information reference signal (CSI RS).

8. The method of claim 1, wherein a number of the subframes configured for a cell having a higher stratum level is larger than a number of the subframes configured for a cell having a lower stratum level.

9. A user equipment (UE) configured to support a network listening in a wireless communication system, the UE comprising:
   a processor that:
      receives a subframe configuration used for the network listening;
      monitors a plurality of subframes indicated by the received subframe configuration,
      wherein the plurality of subframes are used for receiving a reference signal (RS) for a synchronization;
      receives the RS for the synchronization,
      wherein the RS for the synchronization is received in a subframe configured for the network listening among the plurality of subframes,
      wherein signals of the subframe are muted except for the RS for the synchronization,
      wherein the RS for the synchronization is received only in a physical downlink shared channel (PDSCH) region of the plurality of subframes, and the muting of the signals of the subframe also occurs in the PDSCH region of the plurality of subframes, and
      wherein the muting of the signals is performed according to a muting pattern, which is configured and triggered by downlink control information (DCI);
      performs the synchronization based on the RS for the synchronization,
      wherein the synchronization is performed based on stratum levels of cells,
      wherein a density of the RS is increased in order to increase a reliability with a higher stratum level, and
      wherein the subframes are configured proportional to a stratum level in order to have an orthogonal transmission of the RS among cells with same stratum level; and
      receives or transmits data at a timing based on the synchronization.

10. The UE of claim 9, wherein the subframe configuration used for the network listening is a second multicast broadcast single frequency network (MBSFN) subframe configuration for the network listening, which overrides a first MBSFN configuration for MBSFN configuration.

11. The UE of claim 9, wherein the subframe configuration used for the network listening is a subframe configuration for a time division duplex (TDD) frame.

* * * * *